(12) United States Patent
Major et al.

(10) Patent No.: US 9,235,924 B2
(45) Date of Patent: Jan. 12, 2016

(54) CUBIFY BRUSH OPERATION FOR VIRTUAL WORLDS

(71) Applicant: MICROSOFT CORPORATION, Redmond, WA (US)

(72) Inventors: Robert Jason Major, Redmond, WA (US); John Adam Croston, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.

(21) Appl. No.: 14/109,819

(22) Filed: Dec. 17, 2013

(65) Prior Publication Data

US 2015/0170401 A1    Jun. 18, 2015

(51) Int. Cl.
*G06T 15/08*    (2011.01)
*G06T 17/00*    (2006.01)
*G06T 19/00*    (2011.01)
*G06T 15/06*    (2011.01)
*G06T 15/40*    (2011.01)

(52) U.S. Cl.
CPC ............... *G06T 15/08* (2013.01); *G06T 17/00* (2013.01)

(58) Field of Classification Search
None
See application file for complete search history.

(56) References Cited

U.S. PATENT DOCUMENTS

2009/0295800 A1* 12/2009 Vetter .................. G06T 17/005
345/424
2011/0202538 A1   8/2011 Salemann
2013/0163836 A1*  6/2013 Pau ........................ G06T 7/00
382/128

OTHER PUBLICATIONS

Thorvald Natvig, "Simplified Mesh Generation from Renders" NIK 2006 conference, pp. 1-11.*
Sio et al., Volume Rendering with Marching Cube Algorithm, 2011.*
Wang, et al., "Iso-surface Extraction and Optimization Method Based on Marching Cubes," Published Oct. 12, 2009, Proceedings: In Fifth International Conference on Semantics, Knowledge and Grid, Available at: http://ieeexplore.ieee.org/stamp/stamp.jsp?tp=&arnumber=5370239.
Nielson, "On Marching Cubes," Published Jul. 2003, Proceedings: In IEEE Transactions on Visualization and Computer Graphics, vol. 9, Issue 3, Available at: http://ieeexplore.ieee.org/stamp/stamp.jsp?tp=&arnumber=1207437.

(Continued)

*Primary Examiner* — Kee M Tung
*Assistant Examiner* — Frank Chen
(74) *Attorney, Agent, or Firm* — Aaron Chatterjee; Kate Drakos; Micky Minhas

(57) ABSTRACT

Methods for generating a virtual world are described. The virtual world may comprise a three-dimensional gameworld associated with a video game. The virtual world may be represented by a plurality of voxels arranged in a three-dimensional grid. Each voxel of the plurality of voxels may be associated with various attributes such as one or more color values, an opacity value, a location within the virtual world, a fill value, and a cubify value. In some embodiments, the virtual world may be generated or edited using a computer graphics editing tool that assigns one or more cubify values to one or more voxels using a voxel selection tool, such as a cubify brush. A voxel's cubify value may be used to determine how the voxel is rendered by a rendering engine, for example, whether the voxel is rendered as a rectilinear cube or as a smooth isosurface.

20 Claims, 14 Drawing Sheets

(56) References Cited

OTHER PUBLICATIONS

Jin, "An Improved Marching Cubes Method for Surface Reconstruction of Volume Data," Published Jun. 21, 2006, Proceedings: In Proceedings of the Sixth World Congress on Intelligent Control and Automation, Available at: http://ieeexplore.ieee.org/stamp/stamp.jsp?tp=&arnumber=1714052.

Lopes, et al., "Improving the Robustness and Accuracy of the Marching Cubes Algorithm for Isosurfacing," Published Jan. 2003, Proceedings: In IEEE Transactions on Visualization and Computer Graphics, vol. 9, Issue 1 pp. 14, Available at: http://ieeexplore.ieee.org/stannp/stamp.jsp?tp=&arnumber=1175094.

Dietrich, et al., "Edge Transformations for Improving Mesh Quality of Marching Cubes," Published Jan. 2009, Proceedings: In IEEE Transactions on Visualization and Computer Graphics, vol. 15, Issue 1, Available at: http://ieeexplore.ieee.org/stamp/stamp.jsp?tp=&arnumber=4487066.

Montanit, et al., "Discretized Marching Cubes," Published Oct. 17, 1994, Proceedings: In IEEE Conference on Visualization, Available at: http://ieeexplore.ieee.org/stamp/stamp.jsp?tp=&arnumber=346308.

\* cited by examiner

Mobile Device 12

| 10%  | 20%  | 30%  |
|------|------|------|
| 702  | 705  | 707  |
| 30%  | 50%  | 60%  |
| 703  | 701  | 708  |
| 70%  | 80%  | 90%  |
| 704  | 706  | 709  |

FIG. 7E

//www.w3.org/1999/xhtml">
CUBIFY BRUSH OPERATION FOR VIRTUAL WORLDS

BACKGROUND

Video game development may refer to the software development process by which a video game may be produced. A video game may comprise an electronic game that involves human interaction by a game player of the video game for controlling video game objects, such as controlling the movement of a game-related character. The video game may be displayed to the game player via a display device, such as a television screen or computer monitor. The display device may display images corresponding with a gameworld or virtual environment associated with the video game. Various computing devices may be used for playing a video game, generating game-related images associated with the video game, and controlling gameplay interactions with the video game. For example, a video game may be played using a personal computer, handheld computing device, mobile device, or dedicated video game console.

SUMMARY

Technology is described for generating and editing a virtual world. The virtual world may comprise a three-dimensional gameworld associated with a video game. The virtual world may be represented by a plurality of voxels arranged in a three-dimensional grid. Each voxel of the plurality of voxels may be associated with various attributes such as a material (e.g., a grass material or a rock material), one or more color values, an opacity value, a location within the virtual world, a fill value, and a cubify value. In one example, each voxel of the plurality of voxels may be associated with a material and a fill value associated with how much of the voxel is to be filled with the material. In some embodiments, the virtual world may be generated or edited using a computer graphics editing tool that assigns one or more cubify values to one or more voxels using a voxel selection tool, such as a cubify brush. A voxel's cubify value may be used to determine how the voxel is rendered by a rendering engine, for example, whether the voxel is rendered as a rectilinear cube or as a smooth isosurface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7E depicts one embodiment of a two-dimensional slice through nine voxels.

DETAILED DESCRIPTION

Figure 1:
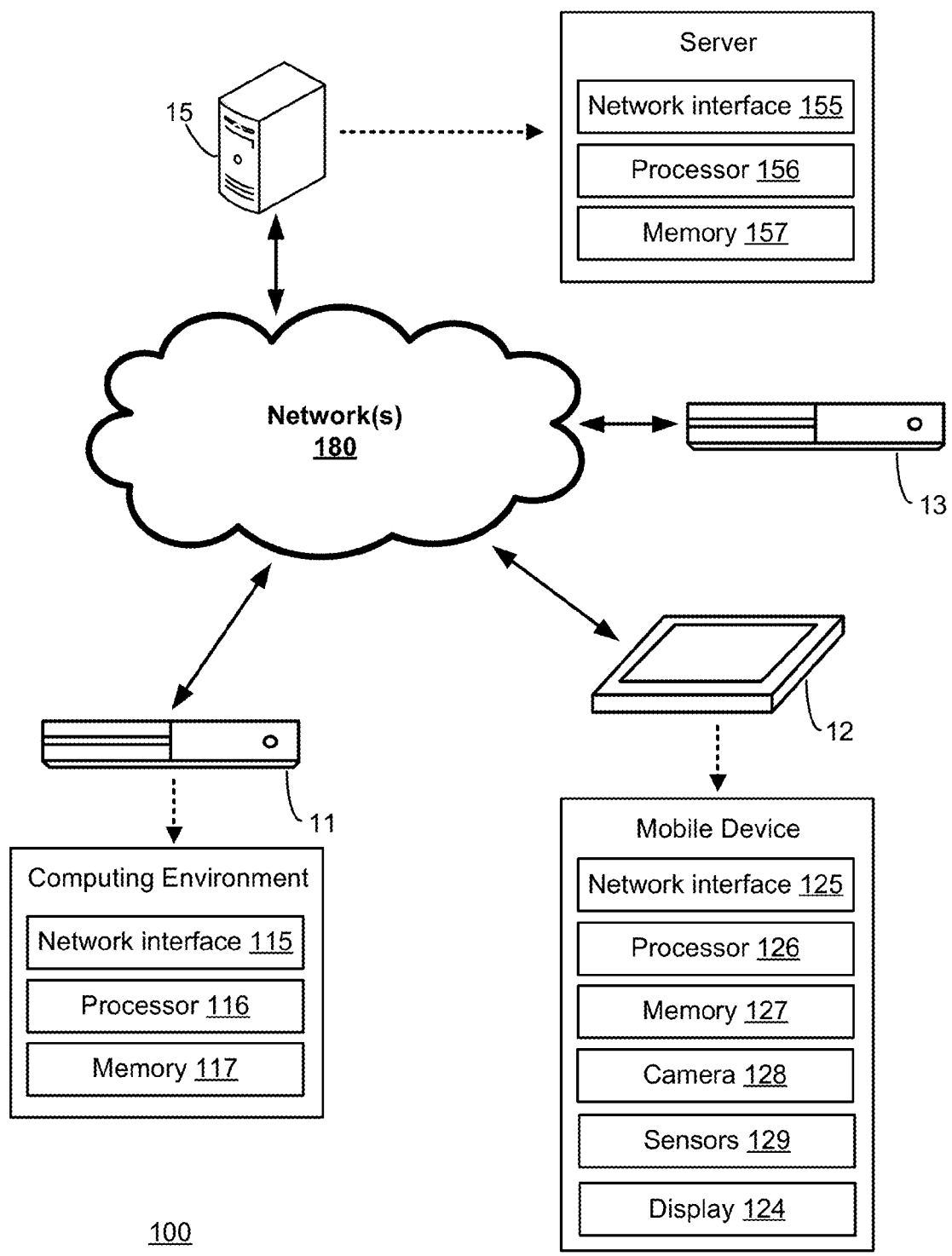
FIG. 1 is a block diagram of one embodiment of a networked computing environment.

Technology is described for generating and editing a virtual world or a computer-generated virtual environment. The virtual world may comprise a three-dimensional gameworld associated with a video game. The virtual world may be represented by a plurality of voxels arranged in a three-dimensional grid. Each voxel of the plurality of voxels may be associated with various attributes such as a material (e.g., a grass material or a rock material), one or more color values, an opacity value, a location within the virtual world, a fill value, and a cubify value. In one example, each voxel of the plurality of voxels may be associated with a material and a fill value associated with how much of the voxel is to be filled with the material. In some embodiments, the virtual world may be generated or edited using a computer graphics editing tool (e.g., an computer graphics editing tool that is integrated with a video game development environment) that assigns one or more cubify values to one or more voxels using a voxel selection tool, such as a cubify brush. A voxel's cubify value may be used to determine how the voxel is rendered by a rendering engine, for example, whether the voxel is rendered as a rectilinear volume (e.g., a rectilinear cube or rectangular prism) or as a smooth isosurface. A cubified voxel may comprise a voxel that is rendered as one or more rectilinear volumes corresponding with horizontal and/or vertical surfaces within the voxel. In some cases, the rendered horizontal and vertical surfaces of a cubified voxel may intersect at 90 degree angles within the voxel.

A virtual world may be generated based on a plurality of voxels arranged in a three-dimensional grid. In one example, each voxel of the plurality of voxels may correspond with a 1 meter by 1 meter by 1 meter volume within the virtual world. In one embodiment, if a particular voxel of the plurality of voxels has been assigned a non-zero cubify value, then the particular voxel may be rendered to include a rectilinear volume that extends to the boundaries of the voxel (e.g., the particular voxel may be rendered as a block or box with the dimensions of the particular voxel) if a fill value associated with the particular voxel is greater than or equal to 50%. If the fill value is less than 50%, then the particular voxel may be rendered without an opaque volume (e.g., as an empty or transparent block). On the other hand, if the particular voxel has been assigned a cubify value of zero, then the particular voxel may be rendered to include smooth isosurfaces.

In some embodiments, a virtual world may be generated using a first set of voxels that may be rendered as rectilinear cubes and a second set of voxels that may be rendered as smooth isosurfaces. In one example, the second set of voxels may be rendered using a marching cubes technique. One benefit of generating the virtual world using both a first set of voxels that may be rendered as rectilinear cubes and a second set of voxels that may be rendered as smooth isosurfaces is that the virtual world may comprise both "man-made" structures that may be better represented using rectilinear volumes (e.g., buildings and walls) and organic smooth surfaces that may be better represented using smooth isosurfaces (e.g., a rolling hill). Thus, the virtual world may be generated using a mixture of both hard edged rectilinear surfaces and smooth rolling surfaces. An end user of a computer graphics editing tool for generating and editing the virtual world may use a cubify brush to identify the first set of voxels and to assign a cubify value to each voxel of the first set of voxels.

In some cases, a particular voxel may be rendered based on both a cubify value associated with the particular voxel and a fill value associated with the particular voxel (e.g., representing a degree to which the voxel should be filled or made opaque) to include rectilinear surfaces that are not on a voxel boundary of the particular voxel. In one embodiment, if a particular voxel has been assigned a non-zero cubify value, then the particular voxel may be rendered to include horizontal and/or vertical surfaces, whose relative heights and/or positions within the particular voxel may be determined based on a fill value associated with the particular voxel. The horizontal and/or vertical surfaces within the particular voxel need not correspond with a boundary of the voxel (e.g., a horizontal surface my cut through the middle of the voxel). In one example, a horizontal surface within the particular voxel may create an opaque sub-volume within the particular voxel that has a 1 meter width, a 1 meter length, and a 0.2 meter height.

In some embodiments, if a particular voxel has been assigned a non-zero cubify value, then the particular voxel may be rendered to include both horizontal and vertical surfaces, whose relative heights and/or positions within the particular voxel may be determined based on a fill value associated with the particular voxel and one or more fill values associated with neighboring voxels of the particular voxel. In one example, the position of a horizontal surface within the particular voxel may be determined based on a first fill value associated with a first voxel located above the particular voxel and a second fill value associated with a second voxel located below the particular voxel. In another example, the position of a vertical surface within the voxel may be determined based on fill values associated with voxels adjacent to the particular voxel that share a common plane that intersects the vertical surface at a 90 degree angle.

One issue involving the development of a video game by a game developer is that the time to create and edit a virtual world associated with the video game (e.g., a gameworld) may be significant. For example, the time to create various gameworld topographies and gameworld objects (e.g., houses and walls) may provide significant barriers to fully developing a gameworld for the video game. Thus, there is a need for providing a video game development environment that enables a game developer to quickly and easily generate and edit a gameworld.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include computing environment 11, computing environment 13, mobile device 12, and server 15. The computing environment 11 may comprise a gaming console for playing video games. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

One embodiment of computing environment 11 includes a network interface 115, processor 116, and memory 117, all in communication with each other. Network interface 115 allows computing environment 11 to connect to one or more networks 180. Network interface 115 may include a wireless network interface, a modem, and/or a wired network interface. Processor 116 allows computing environment 11 to execute computer readable instructions stored in memory 117 in order to perform processes discussed herein.

In some embodiments, the computing environment 11 may include one or more CPUs and/or one or more GPUs. In some cases, the computing environment 11 may integrate CPU and GPU functionality on a single chip. In some cases, the single chip may integrate general processor execution with computer graphics processing (e.g., 3D geometry processing) and other GPU functions including GPGPU computations. The computing environment 11 may also include one or more FPGAs for accelerating graphics processing or performing other specialized processing tasks. In one embodiment, the computing environment 11 may include a CPU and a GPU in communication with a shared RAM. The shared RAM may comprise a DRAM (e.g., a DDR3 SDRAM).

Server 15 may allow a client or computing device to download information (e.g., text, audio, image, and video files) from the server or to perform a search query related to particular information stored on the server. In one example, a computing device may download purchased downloadable content and/or user generated content from server 15 for use with a video game development environment running on the computing device. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 15 includes a network interface 155, processor 156, and memory 157, all in communication with each other. Network interface 155 allows server 15 to connect to one or more networks 180. Network interface 155 may include a wireless network interface, a modem, and/or a wired network interface. Processor 156 allows server 15 to execute computer readable instructions stored in memory 157 in order to perform processes discussed herein.

One embodiment of mobile device 12 includes a network interface 125, processor 126, memory 127, camera 128, sensors 129, and display 124, all in communication with each other. Network interface 125 allows mobile device 12 to connect to one or more networks 180. Network interface 125 may include a wireless network interface, a modem, and/or a wired network interface. Processor 126 allows mobile device 12 to execute computer readable instructions stored in memory 127 in order to perform processes discussed herein. Camera 128 may capture color images and/or depth images of an environment. The mobile device 12 may include outward facing cameras that capture images of the environment and inward facing cameras that capture images of the end user of the mobile device. Sensors 129 may generate motion and/or orientation information associated with mobile device 12. In some cases, sensors 129 may comprise an inertial measurement unit (IMU). Display 124 may display digital images and/or videos. Display 124 may comprise an LED or OLED display. The mobile device 12 may comprise a tablet computer.

In some embodiments, various components of a computing device including a network interface, processor, and memory may be integrated on a single chip substrate. In one example, the components may be integrated as a system on a chip (SOC). In other embodiments, the components may be integrated within a single package.

In some embodiments, a computing device may provide a natural user interface (NUI) to an end user of the computing device by employing cameras, sensors, and gesture recognition software. With a natural user interface, a person's body parts and movements may be detected, interpreted, and used to control various aspects of a computing application running on the computing device. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In one embodiment, a video game development program running on a computing environment, such as computing environment 11, may provide a video game development environment to a game developer that allows the game developer to customize a gameworld environment associated with a video game by virtually sculpting (or shaping) and painting the gameworld and positioning and painting game-related objects within the gameworld (e.g., houses and rocks). The video game development environment may combine game development activities with gameplay. In one example, the video game development environment may prompt a game developer using the computing environment to specify various video game design options such as whether the video game uses a first-person perspective view (e.g., a first-person shooter video game) and/or a third-person perspective view (e.g., a third-person action adventure video game). The video game development environment may then prompt the game developer to select a game story related option (e.g., whether the video game will involve saving a princess or discovering a treasure). Once the game story related option has been selected, the video game development environment may then generate a gameplay sequence (e.g., providing five minutes of gameplay within a gameworld) in which the game developer may control a game-related character (e.g., the game's protagonist) within the gameworld. The game developer may control the game-related character during the gameplay sequence using touch-sensitive input controls or gesture recognition based input controls.

During the gameplay sequence, the game-related character may satisfy a particular gameplay objective that may allow particular game design options to be unlocked or to become available to the game developer. In some cases, some of the video game design options may be locked or otherwise made not accessible to the game developer if the game developer fails to satisfy the particular gameplay objective during the gameplay sequence. In one example, if the particular gameplay objective is not satisfied, then the game developer may be asked to choose what kinds of monsters should be included near a cave entrance within the gameworld. However, if the particular gameplay objective is satisfied, then the game developer may be asked to identify the kinds of monsters to be included near a cave entrance within the gameworld and to provide specific locations for individual monsters within the gameworld. The gameworld may comprise a computer-generated virtual world in which game-related objects associated with the video game (e.g., game-related characters) may be controlled or moved by a game player.

Figure 2:
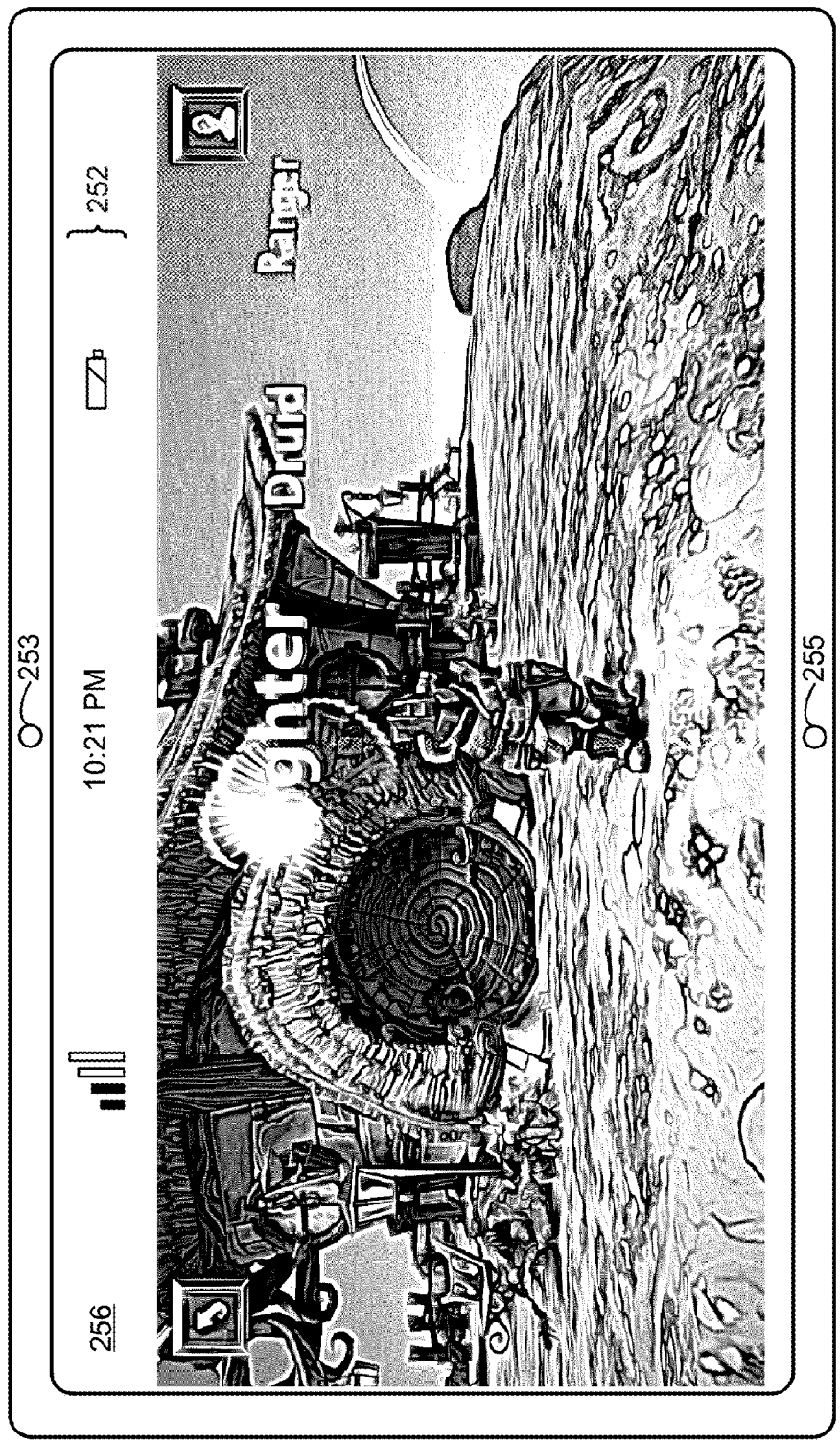
FIG. 2 depicts one embodiment of a mobile device that may be used for providing a video game development environment for creating a video game.

FIG. 2 depicts one embodiment of a mobile device 12 that may be used for providing a video game development environment for creating a video game. The mobile device 12 may comprise a tablet computer with a touchscreen interface. In one embodiment, the video game development environment may run locally on the mobile device 12. In other embodiments, the mobile device 12 may facilitate control of a video game development environment running on a computing environment, such as computing environment 11 in FIG. 1, or running on a server, such as server 15 in FIG. 1, via a wireless network connection. As depicted, mobile device 12 includes a touchscreen display 256, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. In some embodiments, the mobile device may determine a particular location of the mobile device (e.g., via GPS coordinates). The microphone 255 may capture audio associated with the end user (e.g., the end user's voice) for determining the identity of the end user and for handling voice commands issued by the end user. The front-facing camera 253 may be used to capture images of the end user for determining the identity of the end user and for handling gesture commands issued by the end user. In one embodiment, an end user of the mobile device 12 may generate a video game by controlling a video game development environment viewed on the mobile device using touch gestures and/or voice commands.

Figure 3:
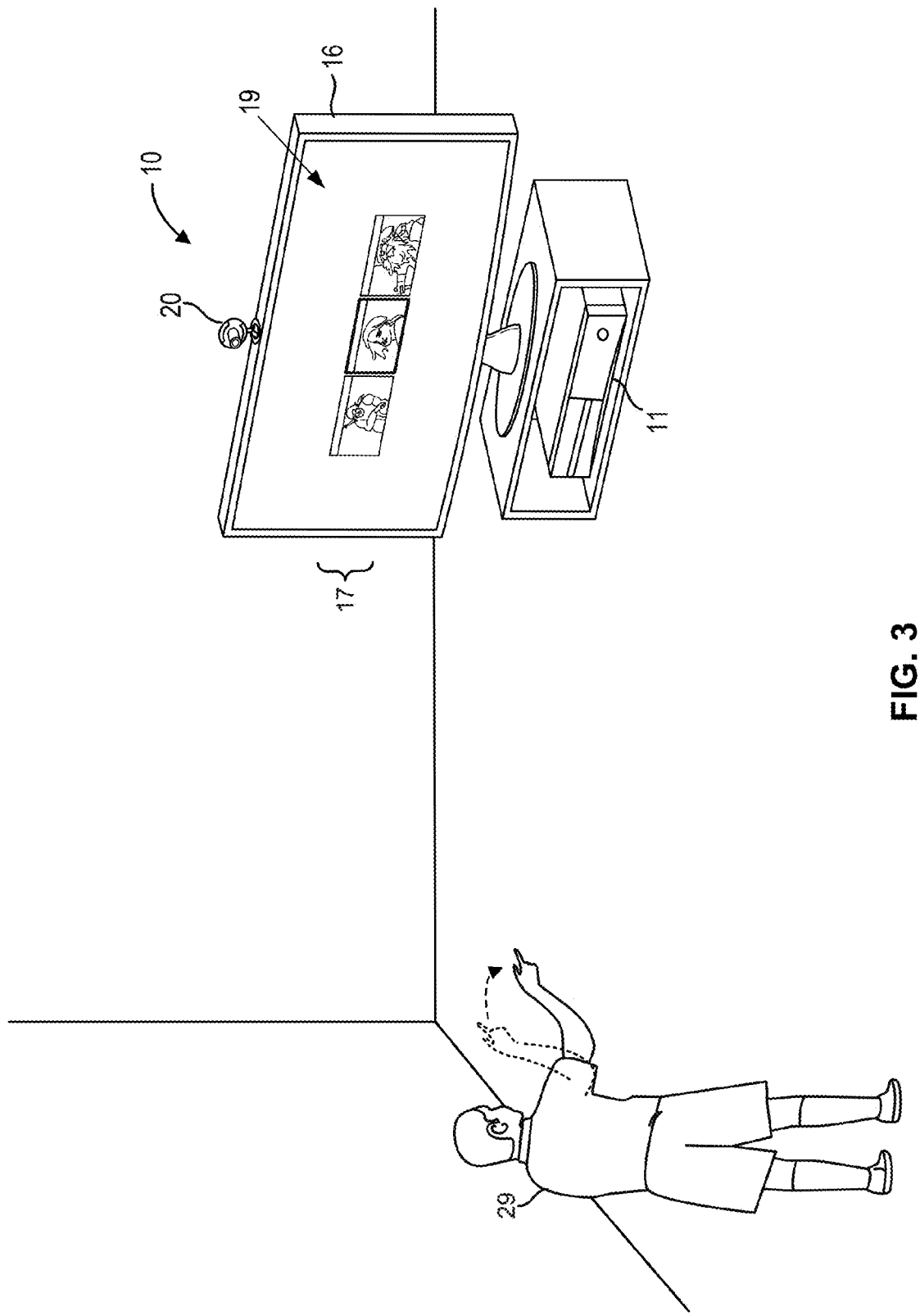
FIG. 3 depicts one embodiment of a computing system for performing gesture recognition.

FIG. 3 depicts one embodiment of a computing system 10 that utilizes depth sensing for performing object and/or gesture recognition. The computing system 10 may include a computing environment 11, a capture device 20, and a display 16, all in communication with each other. Computing environment 11 may include one or more processors. Capture device 20 may include one or more color or depth sensing cameras that may be used to visually monitor one or more targets including humans and one or more other real objects within a particular environment. Capture device 20 may also include a microphone. In one example, capture device 20 may include a depth sensing camera and a microphone and computing environment 11 may comprise a gaming console.

In some embodiments, the capture device 20 may include an active illumination depth camera, which may use a variety of techniques in order to generate a depth map of an environment or to otherwise obtain depth information associated the environment including the distances to objects within the environment from a particular reference point. The techniques for generating depth information may include structured light illumination techniques and time of flight (TOF) techniques.

As depicted in FIG. 3, a user interface 19 is displayed on display 16 such that an end user 29 of the computing system 10 may control a computing application running on computing environment 11. The user interface 19 includes images 17 representing user selectable icons. In one embodiment, computing system 10 utilizes one or more depth maps in order to detect a particular gesture being performed by end user 29. In response to detecting the particular gesture, the computing system 10 may control the computing application, provide input to the computing application, or execute a new computing application. In one example, the particular gesture may be used to identify a selection of one of the user selectable icons associated with one of three different story seeds for a video game. In one embodiment, an end user of the computing system 10 may generate a video game by controlling a video game development environment viewed on the display 16 using gestures.

Figure 4:
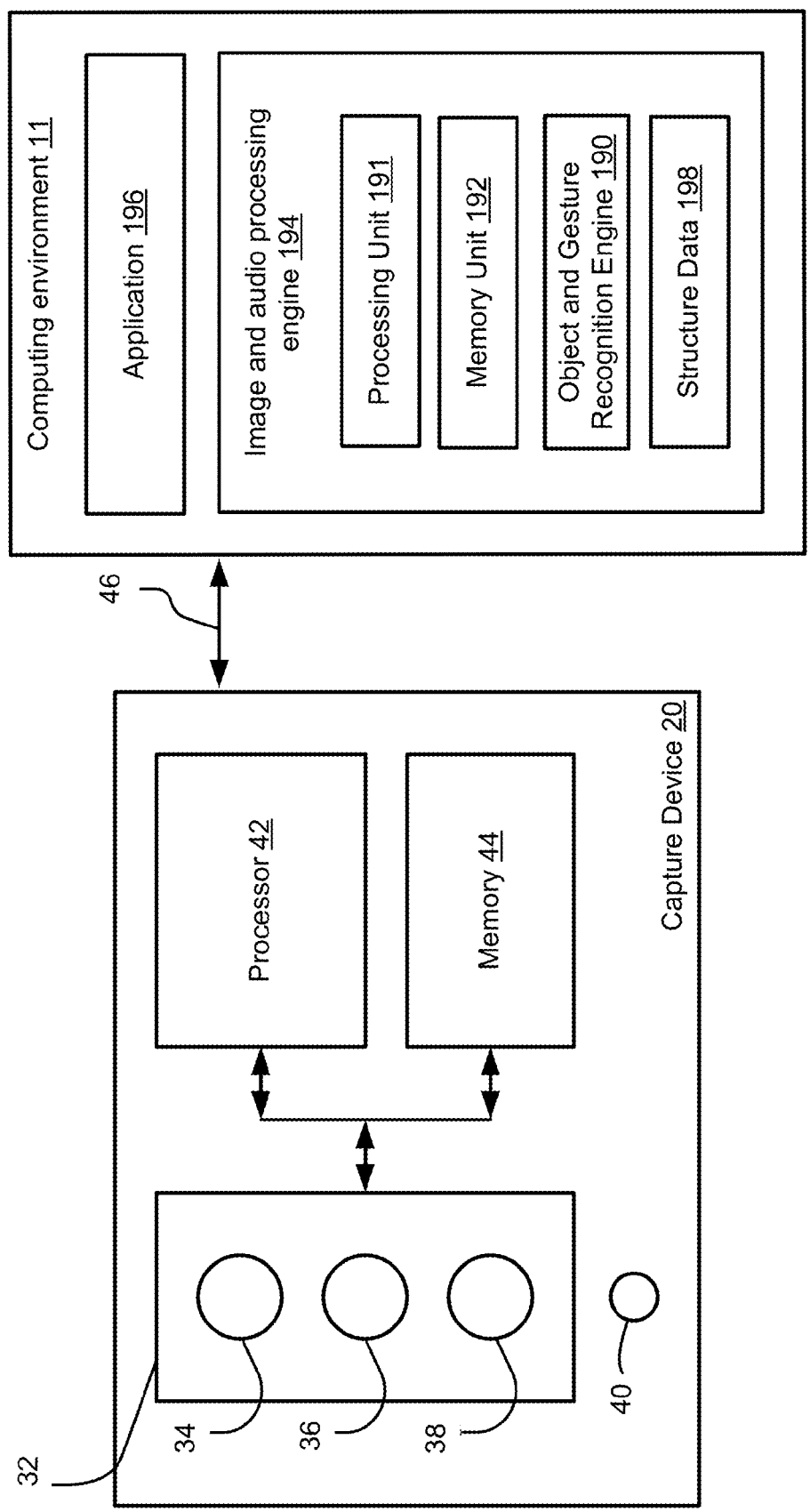
FIG. 4 depicts one embodiment of computing system including a capture device and computing environment.

FIG. 4 depicts one embodiment of computing system 10 including a capture device 20 and computing environment 11. In some embodiments, capture device 20 and computing environment 11 may be integrated within a single computing device. The single computing device may comprise a mobile device, such as mobile device 12 in FIG. 1.

In one embodiment, the capture device 20 may include one or more image sensors for capturing images and videos. An image sensor may comprise a CCD image sensor or a CMOS image sensor. In some embodiments, capture device 20 may include an IR CMOS image sensor. The capture device 20 may also include a depth sensor (or depth sensing camera) configured to capture video with depth information including a depth image that may include depth values via any suitable technique including, for example, time-of-flight, structured light, stereo image, or the like.

The capture device 20 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the image camera component 32.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 20 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 20 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 20 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects. Capture device 20 may include optics for producing collimated light. In some embodiments, a laser projector may be used to create a structured light pattern. The light projector may include a laser, laser diode, and/or LED.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used, or any combination and number of cameras may be used. In one embodiment, the capture device 20 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As depicted, capture device 20 may also include one or more microphones 40. Each of the one or more microphones 40 may include a transducer or sensor that may receive and convert sound into an electrical signal. The one or more microphones may comprise a microphone array in which the one or more microphones may be arranged in a predetermined layout.

The capture device 20 may include a processor 42 that may be in operative communication with the image camera component 32. The processor may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 20.

The capture device 20 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As depicted, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 20 may be housed in a single housing.

The capture device 20 may be in communication with the computing environment 11 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 12 may provide a clock to the capture device 20 that may be used to determine when to capture, for example, a scene via the communication link 46. In one embodiment, the capture device 20 may provide the images captured by, for example, the 3D camera 36 and/or the RGB camera 38 to the computing environment 11 via the communication link 46.

As depicted in FIG. 4, computing environment 11 may include an image and audio processing engine 194 in communication with application 196. Application 196 may comprise an operating system application or other computing application such as a video game development program. Image and audio processing engine 194 includes object and gesture recognition engine 190, structure data 198, processing unit 191, and memory unit 192, all in communication with each other. Image and audio processing engine 194 processes video, image, and audio data received from capture device 20. To assist in the detection and/or tracking of objects, image and audio processing engine 194 may utilize structure data 198 and object and gesture recognition engine 190.

Processing unit 191 may include one or more processors for executing object, facial, and/or voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192. Processing unit 191 may execute computer readable instructions stored in memory unit 192 in order to perform processes discussed herein.

The image and audio processing engine 194 may utilize structure data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize object and gesture recognition engine 190 while performing gesture recognition. In one example, object and gesture recognition engine 190 may include a collection of gesture filters, each comprising information concerning a gesture that may be performed by a skeletal model. The object and gesture recognition engine 190 may compare the data captured by capture device 20 in the form of the skeletal model and movements associated with it to the gesture filters in a gesture library to identify when a user (as represented by the skeletal model) has performed one or more gestures. In one example, image and audio processing engine 194 may use the object and gesture recognition engine 190 to help interpret movements of a skeletal model and to detect the performance of a particular gesture.

More information about detecting objects and performing gesture recognition can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about object and gesture recognition engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

FIGS. 5A-5F depict various embodiments of a video game development environment.

Figure 5A:
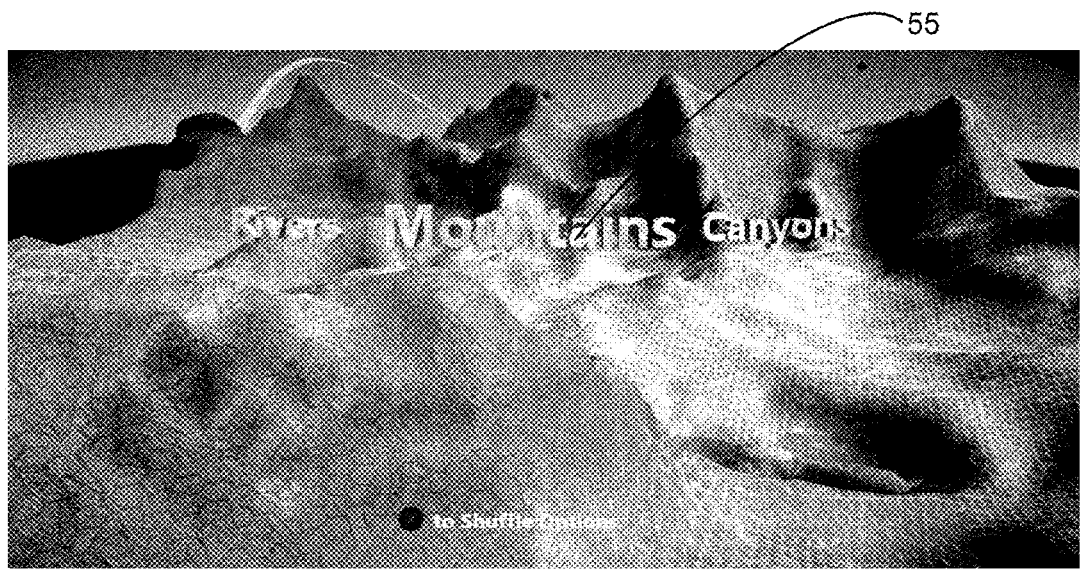
FIG. 5A depicts one embodiment of a video game development environment in which a game developer may select a topography associated with a gameworld.

FIG. 5A depicts one embodiment of a video game development environment in which a game developer may select a topography associated with a gameworld. In one example, the game developer may be given choices 55 regarding the terrain and/or appearance of the gameworld. In one embodiment, the choices 55 may correspond with three predesigned gameworld environments. The game developer may select a type of terrain such as rivers, mountains, and canyons. Based on the terrain selection, the game developer may then select a biome for the gameworld, such as woodlands, desert, or arctic. A biome may comprise an environment in which similar climatic conditions exist. The game developer may also select a time of day (e.g., day, night, or evening) to establish lighting conditions within the gameworld.

Figure 5B:
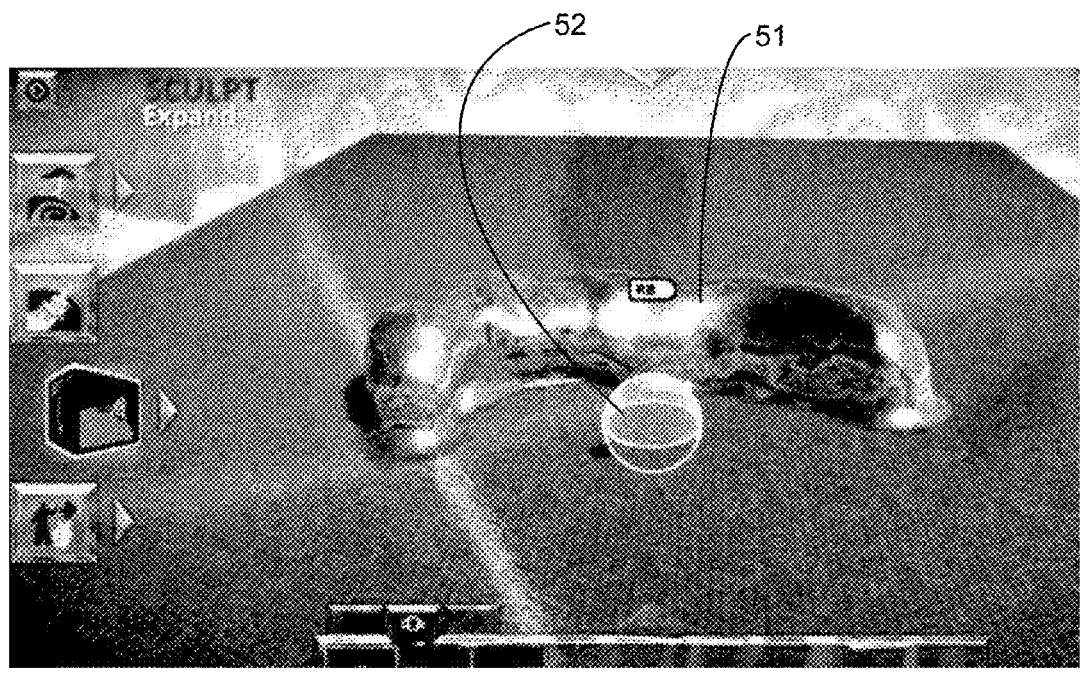
FIG. 5B depicts one embodiment of a video game development environment in which a game developer may sculpt portions of a gameworld.

FIG. 5B depicts one embodiment of a video game development environment in which a game developer may sculpt (or shape) portions of a gameworld. The game developer may use a pointer or selection region for selecting a region within the gameworld to be sculpted. The pointer or selection region may be controlled by the game developer using a touchscreen interface or by performing gestures or voice commands. As depicted, a selection region 52 in the shape of a sphere may be used to sculpt a virtual hill 51 within the gameworld. The game developer may sculpt the virtual hill 51 from a flat gameworld or after portions of a gameworld have already been generated, for example, after a mountainous gameworld has been generated similar to that depicted in FIG. 5A.

Using the selection region 52, the game developer may modify the topography of a gameworld by pushing and/or pulling portions of the gameworld or digging through surfaces of the gameworld (e.g., drilling a hole in a mountain). The game developer may use selection tools to customize the topography of the gameworld and to add objects into the gameworld such as plants, animals, and inanimate objects, such as rocks. Each of the objects placed into the gameworld may be given a "brain" corresponding with programmed object behaviors, such as making a rock run away from a protagonist or fight the protagonist if the protagonist gets within a particular distance of the rock.

Figure 5C:
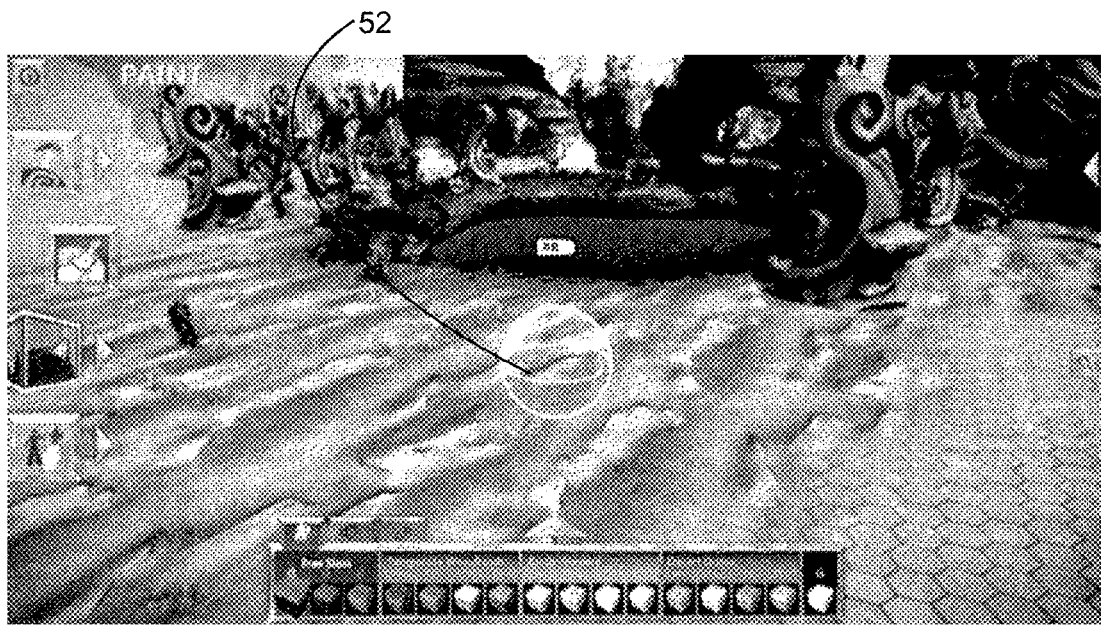
FIG. 5C depicts one embodiment of a videogame development environment in which a game developer may apply a three-dimensional voxel material to portions of a gameworld.

FIG. 5C depicts one embodiment of a videogame development environment in which a game developer may apply a three-dimensional voxel material to portions of a gameworld and/or paint or color portions of the gameworld. The three-dimensional voxel material may comprise a dirt material, a grass material, a snow and ice material, or a rock material. As depicted, a selection region 52 may be used to apply a three-dimensional voxel material to portions of the gameworld. In one example, a region of the gameworld that is originally covered with a dirt material may be converted to a rock material. The game developer was also paint objects, such as rocks and/or NPCs that have been placed into the gameworld by the game developer or automatically placed by the videogame development environment based on previous video game design decision made by the game developer. The NPCs may comprise non-player controlled characters within the gameworld and may include animals, villagers, and hostile creatures. In some cases, a game developer may apply a texture material or apply a three-dimensional voxel material to one or more voxels (e.g., the game developer may cover a hill with a green grass texture) using the selection region 52.

Figure 5D:
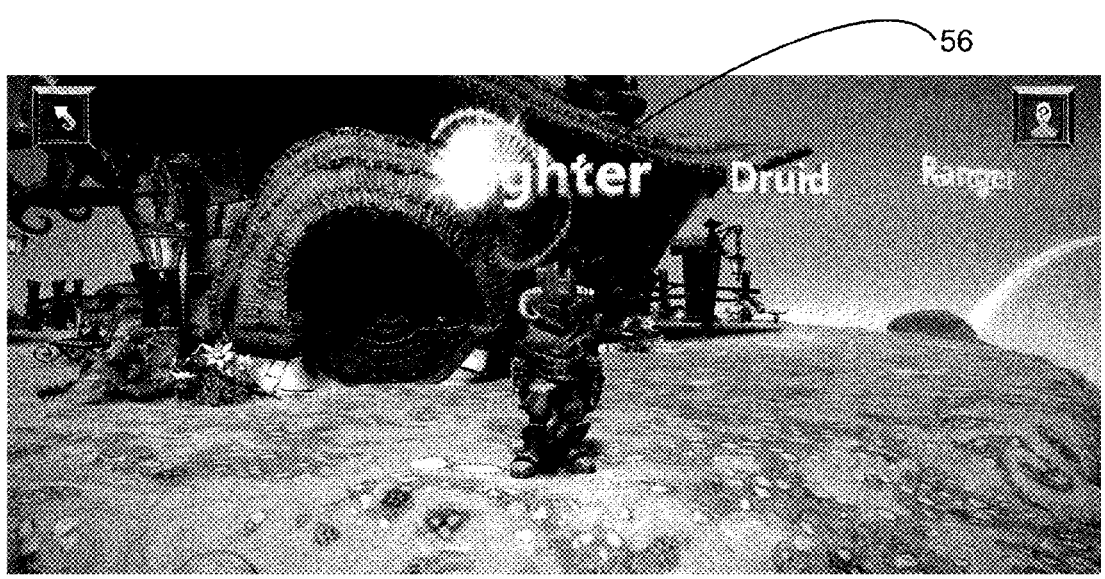
FIG. 5D depicts one embodiment of a videogame development environment in which a game developer may select a protagonist.

FIG. 5D depicts one embodiment of a videogame development environment in which a game developer may select a protagonist. As depicted, the game developer may be given choices 56 regarding which leading game character or protagonist will be controlled by a game player of the video game. In one example, the protagonist may comprise a fighter, druid, or ranger. The protagonist may correspond with a hero of the video game. The selected protagonist may comprise a character that is controlled by the game developer during gameplay sequences provided to the game developer during development of the video game. The selected protagonist may comprise the character that is controlled by a game player when the video game developed by the game developer is generated and outputted for play by the game player.

In some embodiments, the gameplay sequences provided to a game developer during development of a video game may not be accessible or displayed to a game player of the video game (or to anyone once the video game has been created). In this case, after the video game has been generated, the animations and/or data for generating the gameplay sequences may not be part of the video game. In one example, code associated with gameplay sequences during video game development may not be part of the video game.

Figure 5E:
FIG. 5E depicts one embodiment of a videogame development environment in which a story seed may be selected.

FIG. 5E depicts one embodiment of a videogame development environment in which a gameplay archetype or a story seed may be selected. A story seed may correspond with a framework for selecting a sequence of story related events associated with a video game. A particular sequence of story related events (e.g., decided by a game developer) may correspond with a video game plot for the video game. In one example, a story seed may be used to generate one or more game story options associated with story related decisions for creating the video game. In one example, if a story seed is related to a driving game, then a first set of the one or more game story options may be related to a point of view associated with the driving game (e.g., should the driving game use a behind-the-wheel first-person perspective or an outside-the-car third-person perspective), and a second set of the one or more game story options may depend upon a first option (e.g., the game story option related to a behind-the-wheel first-person perspective) of the first set of the one or more game story options and may be related to the primary objective of the driving game (e.g., whether the primary objective or goal of the driving game is to win a car race, escape from an antagonist pursuing the protagonist, or to drive to a particular location within a gameworld). In some cases, a third set of the one or more game story options may depend upon a second option of the one or more game story options and may be related to identification of the protagonist of the driving game.

In some embodiments, the story seed may correspond with a high-level game story selection associated with a root node of a decision tree and non-root nodes of the decision tree may correspond with one or more game story options. Once a selection of a subset of the game story options associated with a particular path between a root node of the tree and a leaf node of the tree has been determined by the game developer, then a video game may be generated corresponding with the particular path. Each of the paths from the root node to a leaf node of the decision tree may correspond with different video games.

In some embodiments, the story seed may correspond with one or more game story options that must be determined by the game developer prior to generating a video game associated with the story seed. The one or more game story options may include selection of a protagonist (e.g., the hero of the video game), selection of an antagonist (e.g., the enemy of the hero), and selection of a primary objective associated with the story seed (e.g., saving a princess by defeating the antagonist). The primary objective may comprise the ultimate game-related goal to be accomplished by the protagonist. As depicted, a game developer may be given choices 58 regarding the story seed associated with the video game. In one example, the game developer may select between one of three story seeds including Finder's Quest, which comprises a mission where the protagonist must find a hidden object within the gameworld and return the hidden object to a particular location within the gameworld.

Once the story seed has been selected by the game developer, then the game developer may be presented with options regarding a secondary game objective. Secondary game objectives may depend upon the selection of the selected story seed or depend on a previously selected game objective (e.g., defeating a particular boss or last stage enemy during a final battle within the video game). In one example, if the selected story seed is associated with finding a hidden object within a gameworld, then the secondary game objective may comprise discovering a tool or resource necessary for finding the hidden object, such as finding a boat to cross a river that must be overcome for finding the hidden object. In another example, if the selected story seed corresponds with having to defend a village from a monster, then the secondary game objective my comprise locating a particular weapon necessary to defeat the monster.

In some embodiments, questions regarding secondary (or dependent) game objectives may be presented to the game developer during one or more gameplay sequences. In one example, after a game developer has selected a story seed, a starting point within the gameworld in which a protagonist must start their journey, and an ending point for the video game (e.g., the last castle where the final boss fight will occur), a gameplay sequence may be displayed to the game developer in which the game developer may control the protagonist to encounter NPCs requesting game development decisions to be made. For example, during a gameplay sequence, the protagonist may encounter a villager asking the protagonist to decide which weapon is best to use against the last stage boss.

Figure 5F:
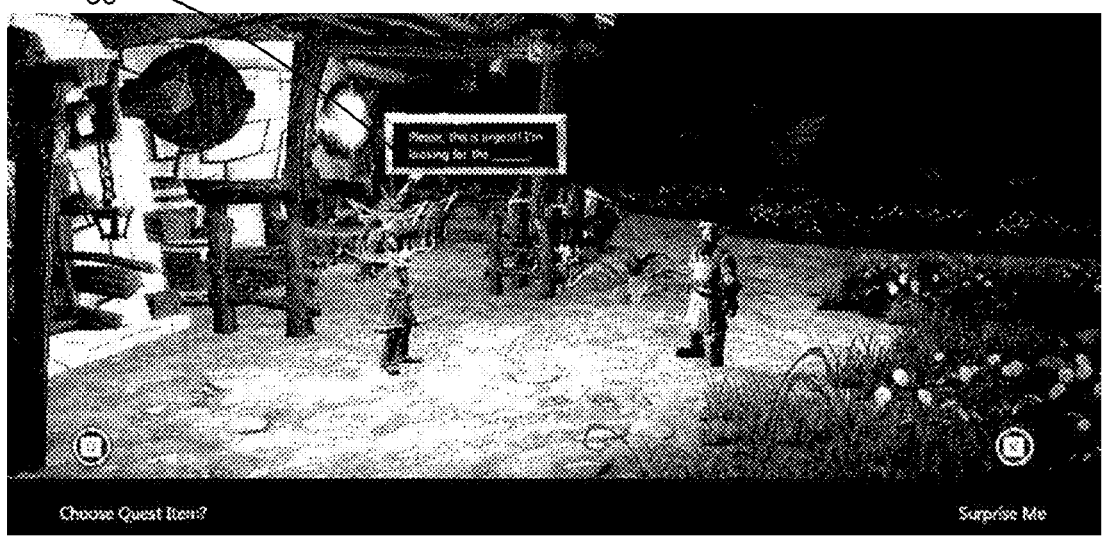
FIG. 5F depicts one embodiment of a videogame development environment in which game development decisions may be made during a gameplay sequence provided to a game developer during game development.

FIG. 5F depicts one embodiment of a videogame development environment in which game development decisions may be made during a gameplay sequence provided to a game developer during game development. The gameplay sequence allows the game developer to engage in gameplay within a game development environment. As depicted, a game developer may be given a choice 59 regarding a type of object to be found within the gameworld. The type of object to be found may correspond with a story seed previously selected by the game developer. In one example, the game developer may control the protagonist (or a character representation of the protagonist) during a gameplay sequence and come across an NPC (e.g., a villager) that interacts with the protagonist and asks a question regarding what type of hidden object should be found. The game developer may specify the object to be found by selecting an object from a list of predetermined objects to be found or by allowing the game development environment to randomly select an object and to automatically assign the object to be found (e.g., by selecting a "surprise me" option).

In some embodiment, during a gameplay sequence a side quest may be discovered by the game developer while moving the protagonist along one or more paths between the starting point and the ending point for the video game. A side quest may comprise an unexpected encounter during the gameplay sequence used for rewarding the game developer for engaging in gameplay. In one embodiment, a side quest may be generated when the game developer places the protagonist within a particular region of the gameworld during a gameplay sequence (e.g., takes a particular path or enters a dwelling within the gameworld environment). The side quest may provide additional gameplay in which the game developer may satisfy conditions that allow additional game development options to become available to the game developer (e.g., additional weapons choices may be unlocked and become available to the protagonist).

Figure 6A:
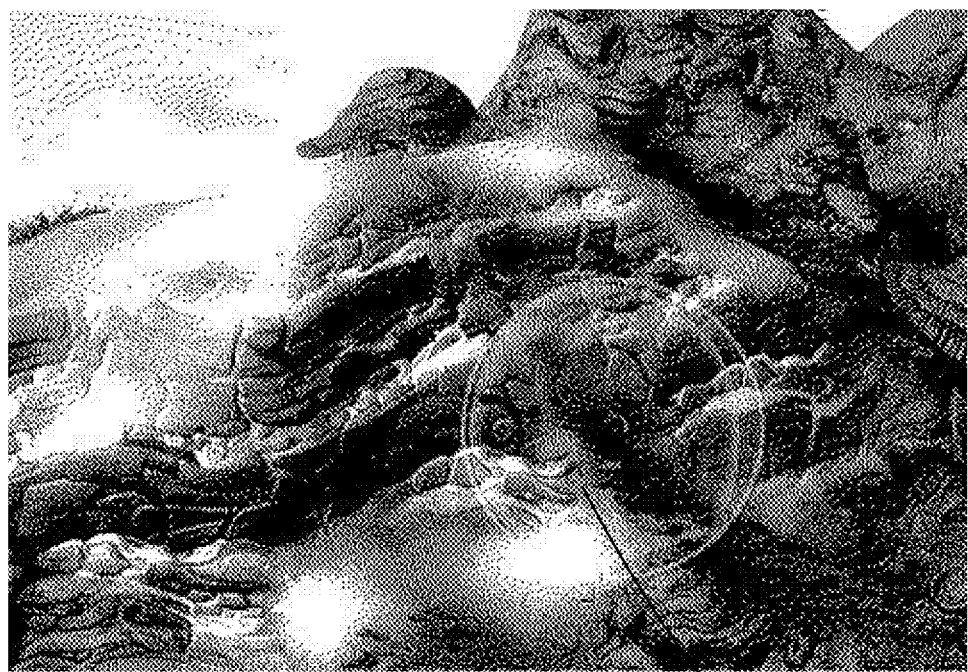
FIG. 6A depicts one embodiment of a video game development environment in which a game developer may assign cubify values to portions of a gameworld.

FIG. 6A depicts one embodiment of a video game development environment in which a game developer may assign cubify values to portions of a gameworld. In one embodiment, a game developer may use a pointer or selection region 601 to select a region of the gameworld or to select an object within the gameworld to be assigned one or more cubify values. The selected region or object may comprise one or more voxels. In some cases, the selection region 601 may be used to assign a cubify value to a single voxel within the gameworld. The pointer or selection region 601 may be controlled by the game developer using a touchscreen interface, such as touchscreen display 256 in FIG. 2.

Figure 6B:
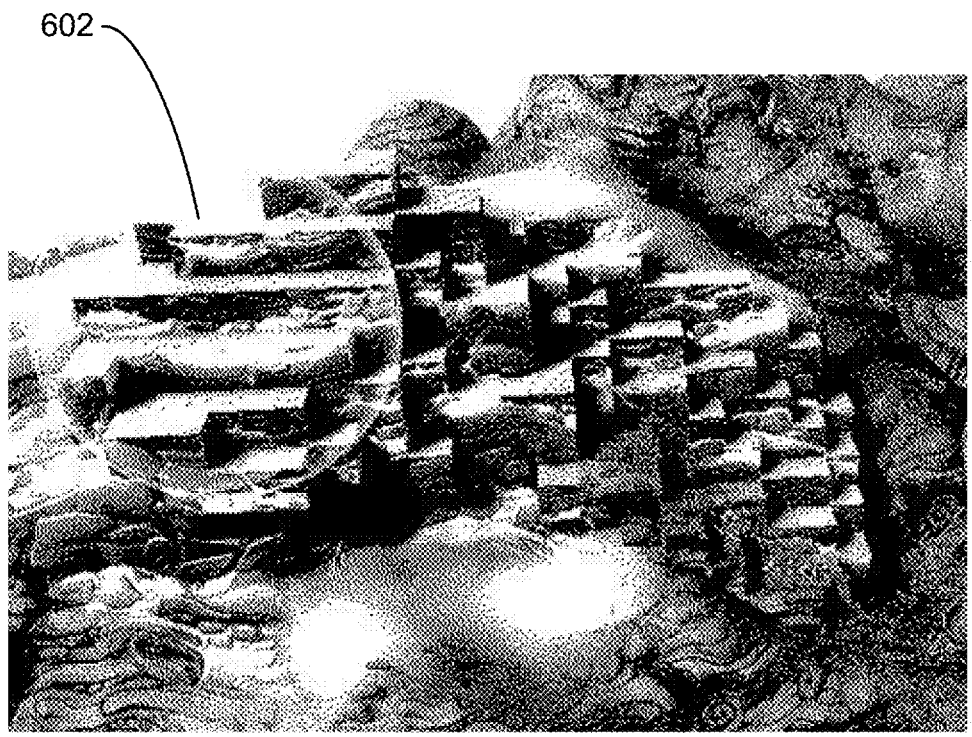
FIG. 6B depicts one embodiment of a video game development environment in which a game developer has assigned a cubify value to a plurality of voxels corresponding with portions of the gameworld depicted in FIG. 6A.

FIG. 6B depicts one embodiment of a video game development environment in which a game developer has assigned a cubify value to a plurality of voxels corresponding with portions of the gameworld depicted in FIG. 6A. As depicted, portions of the gameworld that have been selected using the selection region 602 have been assigned a cubify value such that the underlying voxels have been rendered as rectilinear cubes (e.g., each voxel may be displayed such that it comprises only horizontal and/or vertical surfaces). In one embodiment, a cubify brush (e.g., an editing tool similar to a paintbrush tool for coloring portions of a gameworld) may be used to select one or more voxels within a gameworld to be assigned a cubify value.

Figure 7A:
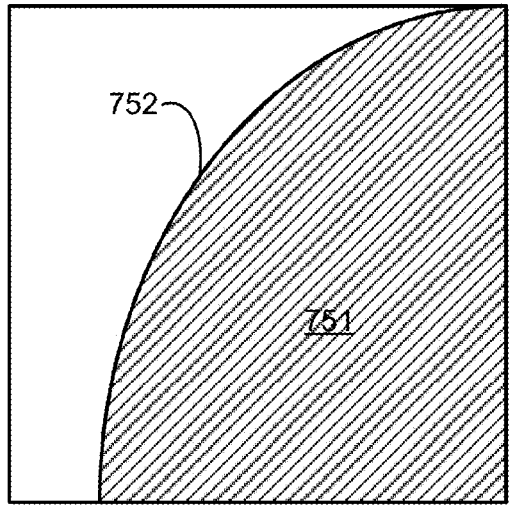
FIGS. 7A-7D depict various embodiments of a two-dimensional slice through a rendered three-dimension voxel.
Figure 7B:
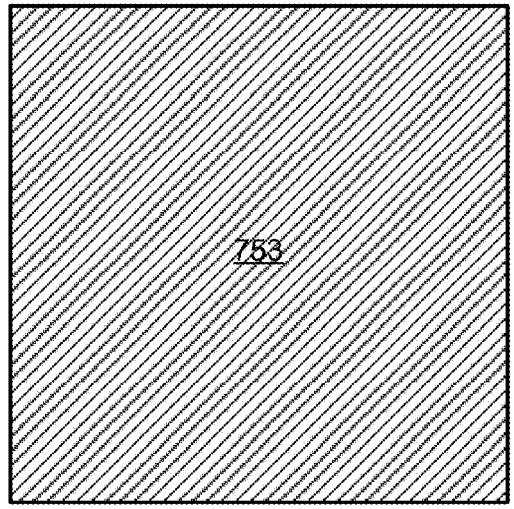
Figure 7C:
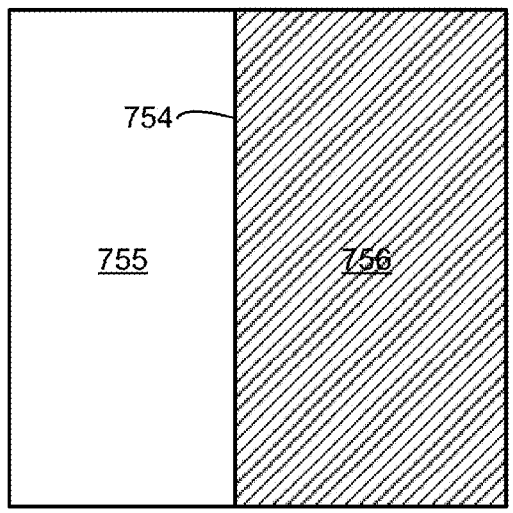
Figure 7D:
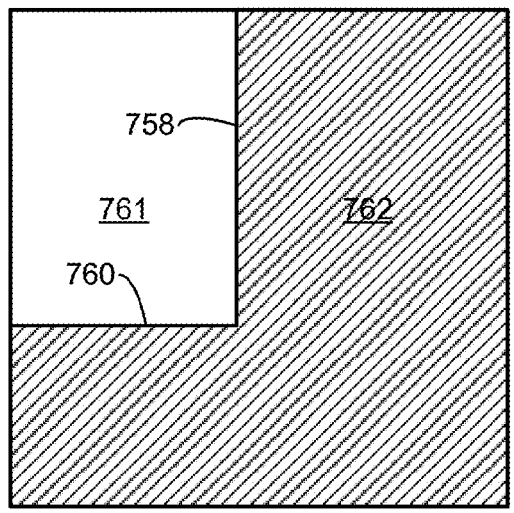

FIGS. 7A-7D depict various embodiments of a two-dimensional slice through a rendered three-dimension voxel. FIG. 7A depicts one embodiment of a two-dimensional slice through a rendered voxel comprising a portion of a smooth isosurface 752 forming a boundary for an opaque volume 751. FIG. 7B depicts one embodiment of a two-dimensional slice through a rendered voxel comprising a rectilinear cube 753, wherein the rectilinear cube extends to the boundaries of the voxel. FIG. 7C depicts one embodiment of a two-dimensional slice through a rendered voxel comprising a portion of a vertical surface 754 extending through the voxel forming a boundary for an opaque rectilinear cube 756 and a transparent region 755. FIG. 7D depicts one embodiment of a two-dimensional slice through a rendered voxel comprising a portion of a vertical surface 758 and a portion of a horizontal surface 760 forming a boundary for an opaque rectilinear volume 762 and a transparent region 761. As depicted, the portion of a vertical surface 754 in FIG. 7C, the portion of a vertical surface 758 in FIG. 7D, and the portion of a horizontal surface 760 in FIG. 7D comprise rectilinear surfaces that are not on a voxel boundary and instead cut through an interior or a mid-section of the voxel. In some embodiments, a rendered horizontal surface and/or vertical surface may be positioned within the voxel based on fill values associated with the voxel and one or more of the voxel's 26 adjacent voxels (e.g., 9 adjacent voxels located above the voxel, 9 adjacent voxels located below the voxel, and 8 adjacent voxels within a plane of the voxel). A first voxel may be adjacent to a second voxel if the first voxel and the second voxel share a common voxel boundary, voxel surface, or voxel point.

FIG. 7E depicts one embodiment of a two-dimensional slice through nine voxels 701-709. As depicted, voxel 701 is adjacent to voxels 702-709. Voxel 701 is directly adjacent to voxel 705 located above voxel 701 and directly adjacent to voxel 706 located below voxel 701. Voxel 701 is associated with a fill value of 50%, voxel 702 is associated with a fill value of 10%, voxel 703 is associated with a fill value of 30%, voxel 704 is associated with a fill value of 70%, voxel 705 is associated with a fill value of 20%, voxel 706 is associated with a fill value of 80%, voxel 707 is associated with a fill value of 30%, voxel 708 is associated with a fill value of 60%, and voxel 709 is associated with a fill value of 90%. In some cases, a fill value may be represented as a percentage value or as a numerical value.

In one embodiment, voxel 701 may be assigned one or more voxel attributes, such as a material (e.g., a grass material or a rock material), one or more color values, an opacity value, a location within a virtual world, a fill value, and a cubify value. The opacity value may correspond with a degree to which light is allowed to travel through a transparent region or volume within the voxel. In some cases, rather than explicitly providing a location of a voxel within the virtual world, the location of the voxel within the virtual world may be inferred based upon its position relative to other voxels representing the virtual world. The one or more colors may correspond with a red value, a green value, and a blue value. The fill value may be represented as a percentage value or as a numerical value that corresponds with a degree to which a voxel is to be filled with an opaque region or volume within the voxel. The cubify value may be used to determine how the voxel is rendered by a rendering engine, for example, whether the voxel is to be rendered as one or more rectilinear cubes or as a smooth isosurface. In one embodiment, each voxel of the plurality of voxels may be associated with a three-dimensional voxel material and a fill value associated with how much of the voxel is to be filled with the three-dimensional voxel material (e.g., 70% of the voxel is to be filled with a green grass texture).

In one embodiment, voxel 701 may be rendered as a rectilinear cube, such as rectilinear cube 753 in FIG. 7B, if the fill value associated with voxel 701 is 50% or higher. In another embodiment, voxel 701 may be rendered to include a vertical surface forming a boundary for an opaque rectilinear cube, such as rectilinear cube 756 in FIG. 7C, if the fill value associated with voxel 701 is 50% or higher and a first adjacent voxel, such as voxel 708, has a second fill value greater than an opposing adjacent voxel, such as voxel 703, located on an opposing surface of voxel 701 relative to the surface shared with the first adjacent voxel. In this case, an opaque rectilinear cube formed within the boundaries of voxel 701 may be formed such that it shares a surface with the first adjacent voxel.

In another embodiment, voxel 701 may be rendered to include a first vertical surface, such as vertical surface 758 in FIG. 7D, and a second horizontal surface, such as horizontal surface 760 in FIG. 7D. The first vertical surface and/or the second horizontal surface may be positioned within the voxel 701. The position of the first vertical surface may be determined based on the fill value associated with voxel 701 and one or more adjacent fill values associated with one or more adjacent voxels that are adjacent to voxel 701. The position of the second horizontal surface may be determined based on the fill value associated with voxel 701 and one or more adjacent fill values associated with one or more adjacent voxels that are adjacent to voxel 701. In one example, the position of the second horizontal surface may be determined based on the fill value of the voxel 701 (e.g., if the fill value is equal to 50%, then the second horizontal surface may extend through a midpoint of the voxel 701) and the rectilinear cube associated with the second horizontal surface may extend towards voxel 706 located below voxel 701 if a first fill value associated with the voxel 706 (e.g., 80%) is greater than a second fill value associated with voxel 705 located above voxel 701 (e.g., 20%). On the other hand, the rectilinear cube associated with the second horizontal surface may extend towards voxel 705 located above voxel 701 if a second fill value associated with voxel 705 is greater than a first fill value associated with voxel 706 located below voxel 701.

Figure 8A:
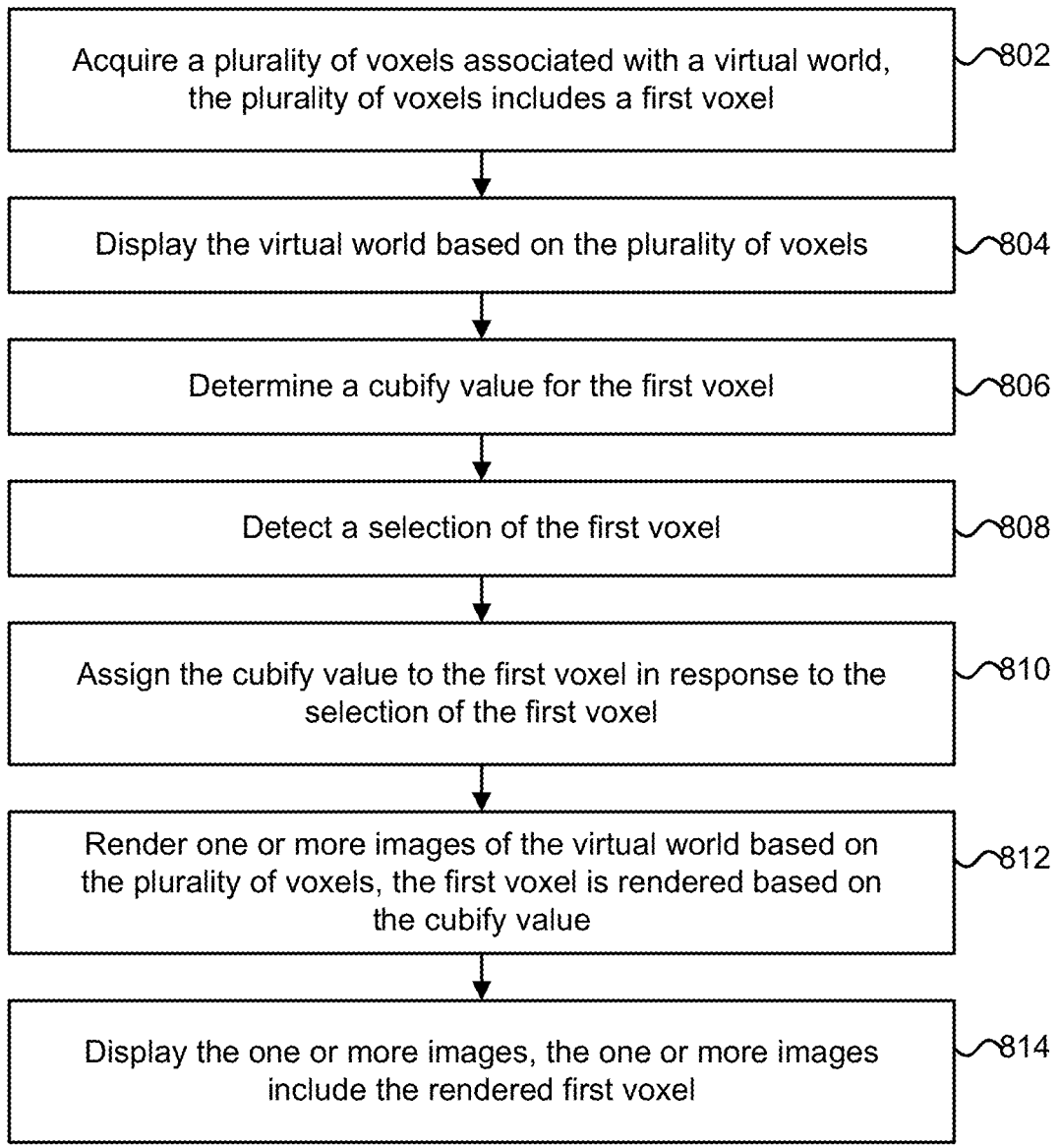
FIG. 8A is a flowchart describing one embodiment of a method for generating a virtual world.

FIG. 8A is a flowchart describing one embodiment of a method for generating a virtual world. In one embodiment, the process of FIG. 8A may be performed by a gaming console or computing environment, such as computing environment 11 in FIG. 1.

In step 802, a plurality of voxels associated with a virtual world is acquired. The plurality of voxels may include a first voxel. In step 804, the virtual world is displayed based on the plurality of voxels or a current state of the plurality of voxels. The virtual world may be displayed on a display, such as display 124 in FIG. 1. In step 806, a cubify value is determined for the first voxel. In one embodiment, a digital cubify value (e.g., a value of 1.0) may be assigned if a voxel is to be rendered such that if a fill value associated with the voxel is 50% or greater, then the voxel may be rendered as a rectilinear cube or a rectangular prism that extends to the boundaries of the voxel. If a fill value associated with the voxel is less than 50%, then the voxel may be rendered as a transparent block. In another embodiment, an analog cubify value (e.g., a value of 0.5) may be assigned if a voxel is to be rendered based on a fill value associated with the voxel and the position of a vertical surface within the voxel and/or a horizontal surface within the voxel are to be determined based on one or more adjacent fill values associated with one or more adjacent voxels of the voxel. In this case, an opaque rectilinear volume within the voxel may be rendered such that the vertical surface and/or the horizontal surface do not extend to or include the boundaries of the voxel.

In step 808, a selection of the first voxel is detected. In one embodiment, the selection of the first voxel may be detected based on a location of a cubify brush within the virtual world. The cubify brush may be used to assign a cubify value to a particular voxel within the virtual world. In one example, the cubify brush may be used to assign the cubify value to one or more voxels within the virtual world such that the one or more voxels comprise cubified voxels. In some cases, a voxel selection tool may assign a cubify value to a plurality of voxels within the virtual world corresponding with an object in the virtual world (e.g., if one voxel of the object is selected, then all voxels associated with the object may be assigned the same cubify value). In step 810, the cubify value is assigned to the first voxel in response to the selection of the first voxel.

In step 812, one or more images of the virtual world are rendered based on the plurality of voxels subsequent to the cubify value being assigned to the first voxel. The first voxel may be rendered based on the cubify value. In one embodiment, if the first voxel has been assigned a non-zero cubify value, then the first voxel may be rendered to include a rectilinear volume that extends to the boundaries of the voxel if a fill value associated with the first voxel is greater than or equal to 50%. If the fill value is less than 50%, then the first voxel may be rendered as a transparent block. On the other hand, if the first voxel has been assigned a cubify value of zero, then the first voxel may be rendered to include smooth isosurfaces.

In some embodiments, the first voxel may be rendered based on the cubify value associated with the first voxel and a fill value associated with the first voxel. The first voxel may be rendered to include rectilinear surfaces that are not on a voxel boundary of the first voxel. In one example, if the first voxel has been assigned a non-zero cubify value, then the first voxel may be rendered to include a horizontal surface and a vertical surface, whose position (or positions) within the first voxel may be determined based on a fill value associated with the first voxel. In another example, if the first voxel has been assigned a non-zero cubify value, then the first voxel may be rendered to include a horizontal surface and a vertical surface, whose position (or positions) within the first voxel may be determined based on a fill value associated with the first voxel and one or more fill values associated with neighboring (or adjacent) voxels of the first voxel.

In some embodiments, the position of the horizontal surface within the first voxel may be determined based on a first fill value associated with a first voxel located above the first voxel and a second fill value associated with a second voxel located below the first voxel. If the second fill value is greater than or equal to the first fill value, then a rectilinear volume (e.g., an opaque cube or an opaque rectangular prism) associated with the horizontal surface may extend towards the second voxel located below the first voxel. In some cases, the position of the horizontal surface within the first voxel may be determined based on the fill value of the first voxel. In one example, if the fill value associated with the first voxel is equal to 30%, then the second horizontal surface may be positioned within the first voxel such that 30% of the voxel volume is covered by an opaque rectilinear volume. If the fill value associated with the first voxel is equal to 80%, then the second horizontal surface may be positioned within the first voxel such that 80% of the voxel volume is covered by an opaque rectilinear volume.

In step 814, the one or more images are displayed. The one or more images may include the rendered first voxel. The one or more images of the virtual world may be displayed on a display, such as display 124 in FIG. 1. In some embodiments, the virtual world may be rendered based on a first set of voxels that may be rendered as rectilinear cubes and a second set of voxels that may be rendered as smooth isosurfaces. The virtual world may be displayed such that the virtual world includes a mixture of both hard edged rectilinear surfaces and smooth rolling surfaces.

Figure 8B:
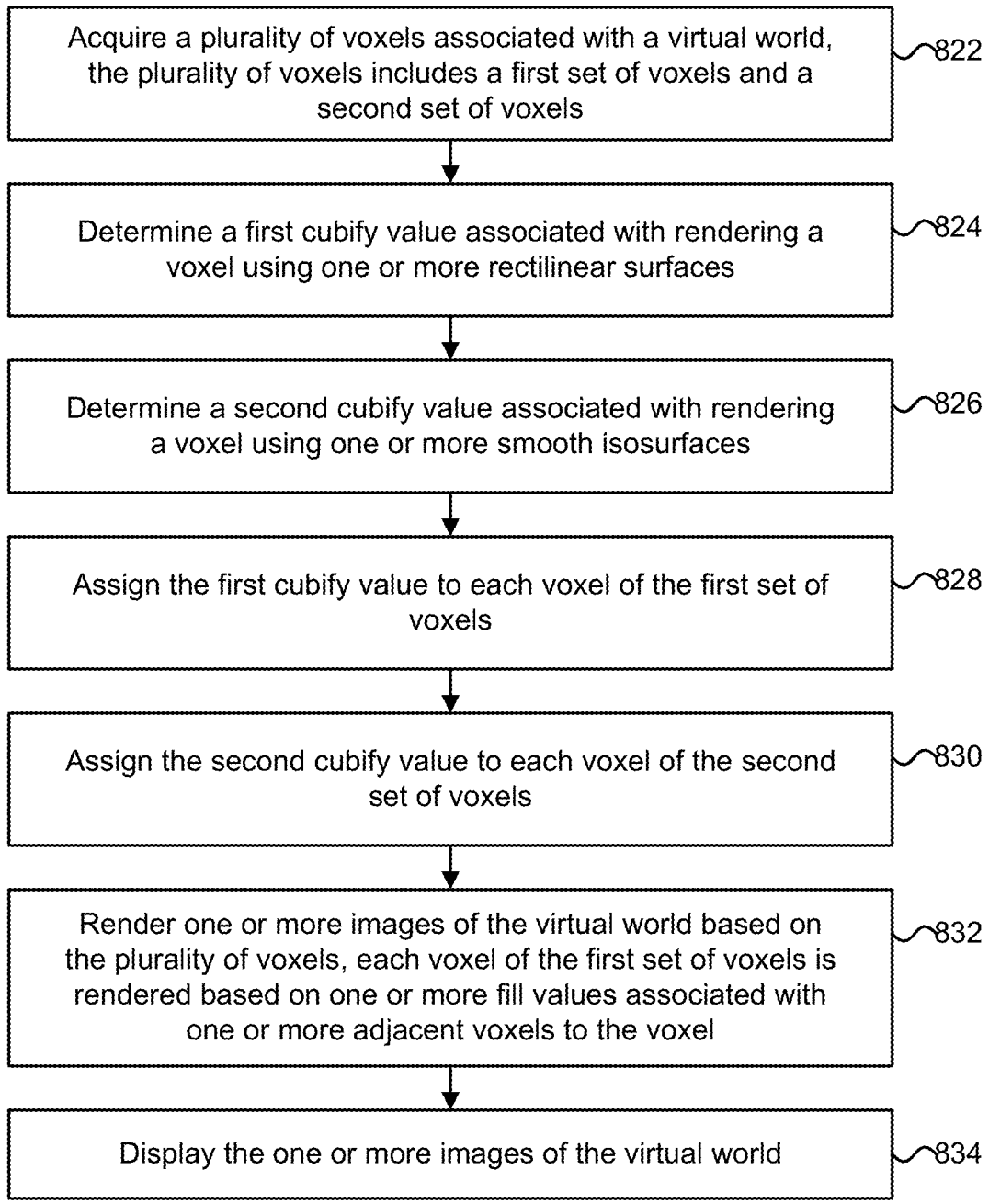
FIG. 8B is a flowchart describing an alternative embodiment of a method for generating a virtual world.

FIG. 8B is a flowchart describing an alternative embodiment of a method for generating a virtual world. In one embodiment, the process of FIG. 8B may be performed by a gaming console or computing environment, such as computing environment 11 in FIG. 1.

In step 822, a plurality of voxels associated with a virtual world is acquired. The plurality of voxels may include a first set of voxels and a second set of voxels. In step 824, a first cubify value associated with rendering a voxel using one or more rectilinear surfaces is determined. The first cubify value may comprise a non-zero number or a first alphanumeric sequence. In step 826, a second cubify value associated with rendering a voxel using one or more smooth isosurfaces is determined. The second cubify value may comprise a zero value, a null value, or a second alphanumeric sequence.

In step 828, the first cubify value is assigned to each voxel of the first set of voxels. In one embodiment, a cubify brush may be used to assign the first cubify value to the first set of voxels. In some cases, a voxel selection tool may assign the first cubify value to the first set of voxels. In step 830, the second cubify value is assigned to each voxel of the second set of voxels.

In step 832, one or more images of the virtual world are rendered based on the plurality of voxels. Each voxel of the first set of voxels may be rendered based on one or more fill values associated with one or more adjacent voxels to the voxel. In one embodiment, a first voxel of the first set of voxels may be rendered based on one or more fill values associated with one or more adjacent voxels to the first voxel. In one example, the first voxel may be rendered based on the first cubify value associated with the first voxel and a fill value associated with the first voxel. The first voxel may be rendered to include rectilinear surfaces that are not on a voxel boundary of the first voxel. In one example, if the first voxel has been assigned a non-zero cubify value, then the first voxel may be rendered to include a horizontal surface whose position within the first voxel may be determined based on a fill value associated with the first voxel. In another example, if the first voxel has been assigned a non-zero cubify value, then the first voxel may be rendered to include a horizontal surface whose position within the first voxel may be determined based on a fill value associated with the first voxel and one or more fill values associated with adjacent voxels of the first voxel.

In some embodiments, the position of the horizontal surface within the first voxel may be determined based on a first fill value associated with a first voxel located above the first voxel and a second fill value associated with a second voxel located below the first voxel. If the second fill value is greater than or equal to the first fill value, then an opaque rectilinear volume including the horizontal surface may extend towards the second voxel located below the first voxel. In some cases, the position of the horizontal surface within the first voxel may be determined based on the fill value of the first voxel. In one example, if the fill value associated with the first voxel is equal to 10%, then the second horizontal surface may be positioned within the first voxel such that 10% of the voxel volume is covered by the opaque rectilinear volume.

In step 834, the one or more images of the virtual world are displayed. The one or more images of the virtual world may be displayed on a display, such as display 124 in FIG. 1. The one or more images of the virtual world may include both hard edged rectilinear surfaces and smooth rolling surfaces.

One embodiment of the disclosed technology includes acquiring a plurality of voxels associated with a virtual world. The plurality of voxels includes a first voxel. The method further comprises assigning a cubify value to the first voxel using a voxel selection tool and rendering one or more images of the virtual world based on the plurality of voxels. The first voxel is rendered to include one or more rectilinear surfaces positioned within the first voxel based on the cubify value assigned to the first voxel. The method further comprises displaying the one or more images. The one or more images include the rendered first voxel.

One embodiment of the disclosed technology includes a memory and one or more processors in communication with the memory. The memory stores a plurality of voxels associated with a virtual world. The plurality of voxels includes a first voxel. The one or more processors assign a cubify value to the first voxel using a voxel selection tool and render one or more images of the virtual world based on the plurality of voxels. The first voxel is rendered to include one or more rectilinear surfaces positioned within the first voxel based on the cubify value assigned to the first voxel. The one or more processors cause the one or more images to be displayed (e.g., on a touchscreen display). The one or more images include the rendered first voxel.

One embodiment of the disclosed technology includes acquiring at a computing system a plurality of voxels associated with a virtual world. The plurality of voxels includes a first voxel. The first voxel is associated with a first fill value. The method further comprises assigning a first cubify value to the first voxel. The first cubify value is associated with causing the first voxel to be rendered using one or more rectilinear surfaces. The method further comprises rendering one or more images of the virtual world based on the plurality of voxels. The first voxel is rendered to include the one or more rectilinear surfaces. The one or more rectilinear surfaces are positioned within the first voxel based on the first fill value. The rendering one or more images includes rendering the first voxel based on one or more fill values associated with one or more adjacent voxels to the first voxel. The method further comprises displaying the one or more images. The one or more images include the rendered first voxel.

Figure 9:
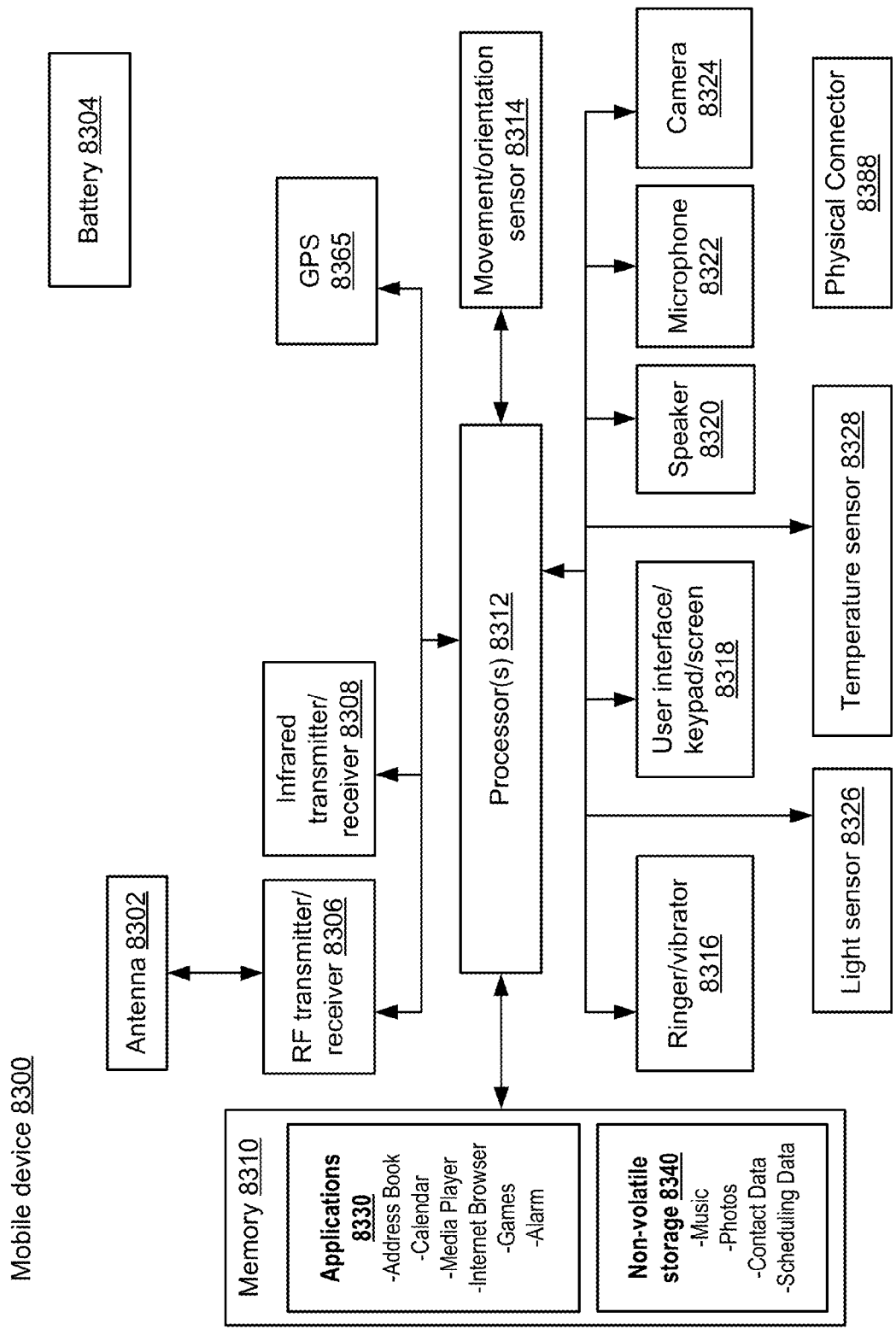
FIG. 9 is a block diagram of one embodiment of a mobile device.
Figure 10:
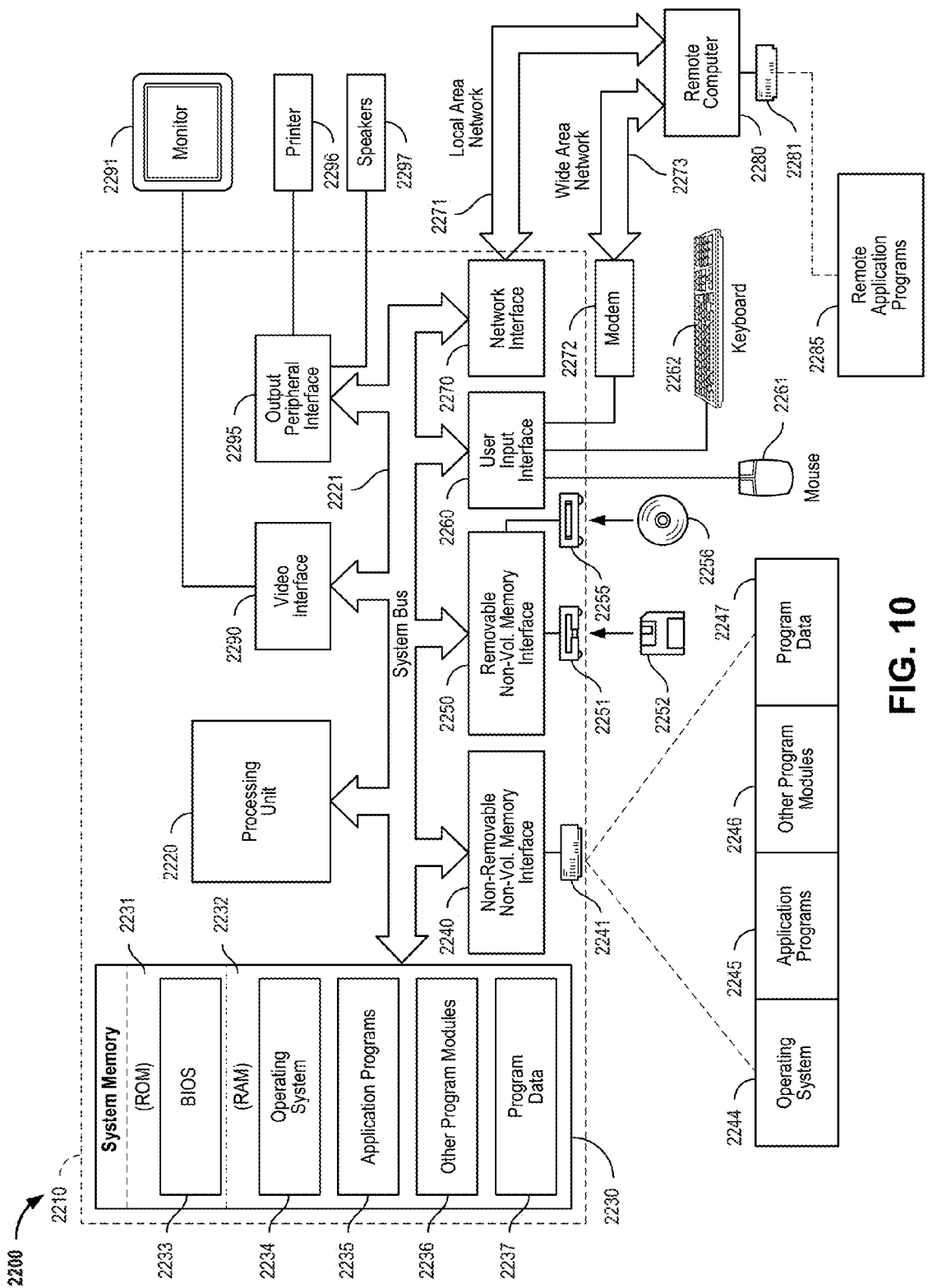
FIG. 10 is a block diagram of an embodiment of a computing system environment.

The disclosed technology may be used with various computing systems. FIGS. 9-10 provide examples of various computing systems that can be used to implement embodiments of the disclosed technology.

FIG. 10 is a block diagram of one embodiment of a mobile device 8300, such as mobile device 12 in FIG. 1. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200, such as computing environment 11 in FIG. 1. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology may be operational with numerous other general purpose or special purpose computing system environments. Examples of other computing system environments that may be suitable for use with the disclosed technology include, but are not limited to, personal computers, server computers, hand-held or laptop devices, multiprocessor systems, microprocessor-based systems, programmable consumer electronics, network PCs, minicomputers, mainframe computers, and distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating a virtual world, comprising:
   acquiring a plurality of voxels associated with the virtual world, the plurality of voxels includes a first voxel;
   assigning a cubify value to the first voxel using a voxel selection tool;
   rendering one or more images of the virtual world based on the plurality of voxels, the first voxel is rendered to include one or more rectilinear surfaces positioned within the first voxel based on the cubify value assigned to the first voxel; and
   displaying the one or more images, the one or more images include the rendered first voxel.

2. The method of claim 1, wherein:
   the rendering one or more images includes rendering the first voxel based on one or more fill values associated with one or more adjacent voxels to the first voxel.

3. The method of claim 2, wherein:
   the one or more adjacent voxels include a second voxel located above the first voxel and a third voxel located below the first voxel, the second voxel is associated with a second fill value, the third voxel is associated with a third fill value.

4. The method of claim 3, wherein:
   the one or more rectilinear surfaces positioned within the first voxel include a horizontal surface positioned within the first voxel, the rendering the first voxel includes rendering a rectilinear volume extending from the horizontal surface based on the second fill value and the third fill value.

5. The method of claim 4, wherein:
   the rectilinear volume extending from the horizontal surface extends towards the second voxel if the second fill value is greater than the third fill value.

6. The method of claim 4, wherein:
   the rectilinear volume extending from the horizontal surface comprises an opaque rectilinear prism.

7. The method of claim 1, wherein:
   the one or more rectilinear surfaces positioned within the first voxel include a vertical surface positioned within the first voxel, the vertical surface is positioned within the first voxel based on a fill value associated with the first voxel.

8. The method of claim 1, wherein:
   the plurality of voxels includes a second voxel, the second voxel is rendered to include one or more smooth isosurfaces, the one or more images include the rendered first voxel and the rendered second voxel.

9. The method of claim 1, wherein:
   the virtual world comprises a gameworld; and
   the voxel selection tool comprises a cubify brush.

10. The method of claim 1, wherein:
the assigning a cubify value includes simultaneously assigning the cubify value to a first set of voxels of the plurality of voxels associated with an object within the virtual world using the voxel selection tool.

11. The method of claim 1, wherein:
the displaying the one or more images includes displaying the one or more images using a touchscreen display; and
the assigning a cubify value includes assigning the cubify value to the first voxel using the touchscreen display.

12. A system for generating a virtual world, comprising:
a memory, the memory stores a plurality of voxels associated with the virtual world, the plurality of voxels includes a first voxel; and
one or more processors in communication with the memory, the one or more processors assign a cubify value to the first voxel using a voxel selection tool, the one or more processors render one or more images of the virtual world based on the plurality of voxels, the first voxel is rendered to include one or more rectilinear surfaces positioned within the first voxel based on the cubify value assigned to the first voxel, the one or more processors cause the one or more images to be displayed, the one or more images include the rendered first voxel.

13. The system of claim 12, wherein:
the one or more processors render the first voxel based on one or more fill values associated with one or more adjacent voxels to the first voxel.

14. The system of claim 13, wherein:
the one or more adjacent voxels include a second voxel located above the first voxel and a third voxel located below the first voxel, the second voxel is associated with a second fill value, the third voxel is associated with a third fill value.

15. The system of claim 14, wherein:
the one or more rectilinear surfaces positioned within the first voxel include a horizontal surface positioned within the first voxel, the one or more processors render the first voxel to include a rectilinear volume extending from the horizontal surface based on the second fill value and the third fill value.

16. The system of claim 15, wherein:
the rectilinear volume extending from the horizontal surface extends towards the second voxel if the second fill value is greater than the third fill value.

17. The system of claim 15, wherein:
the rectilinear volume extending from the horizontal surface comprises an opaque rectilinear prism.

18. The system of claim 12, wherein:
the virtual world comprises a gameworld; and
the voxel selection tool comprises a cubify brush.

19. One or more physical hardware storage devices containing processor readable code for programming one or more processors to perform a method for generating a virtual world using a computing system comprising the steps of:
acquiring at the computing system a plurality of voxels associated with the virtual world, the plurality of voxels includes a first voxel, the first voxel is associated with a first fill value;
assigning a first cubify value to the first voxel, the first cubify value is associated with causing the first voxel to be rendered using one or more rectilinear surfaces;
rendering one or more images of the virtual world based on the plurality of voxels, the first voxel is rendered to include the one or more rectilinear surfaces, the one or more rectilinear surfaces are positioned within the first voxel based on the first fill value, the rendering one or more images includes rendering the first voxel based on one or more fill values associated with one or more adjacent voxels to the first voxel; and
displaying the one or more images, the one or more images include the rendered first voxel.

20. The one or more physical hardware storage devices of claim 19, wherein:
the one or more rectilinear surfaces positioned within the first voxel include a horizontal surface positioned within the first voxel, the rendering the first voxel includes rendering an opaque rectangular prism extending from the horizontal surface.

* * * * *